United States Patent [19]
Gidick

[11] B 3,914,159
[45] Oct. 21, 1975

[54] REVERSING CLUTCH
[75] Inventor: Ward F. Gidick, West Newton, Pa.
[73] Assignee: Koppers Company, Inc., Pittsburgh, Pa.
[22] Filed: Sept. 4, 1973
[21] Appl. No.: 394,300
[44] Published under the Trial Voluntary Protest Program on January 28, 1975 as document no. B 394,300.

[52] U.S. Cl. ............... 202/270; 202/141; 202/151
[51] Int. Cl.² .................. C10B 21/10; C10B 21/06
[58] Field of Search ........... 202/270, 139, 141, 142, 202/143, 144, 151; 192/21, 43, 44, 45; 110/83

[56] References Cited
UNITED STATES PATENTS
3,344,039  9/1967  Nestler ............................... 202/141
3,433,716  3/1969  Tucker ............................... 202/151
3,656,591  4/1972  Marland et al. .................... 192/45

Primary Examiner—A. Louis Monacell
Assistant Examiner—D. Sanders
Attorney, Agent, or Firm—Sherman H. Barber; Olin E. Williams; Oscar B. Brumback

[57] ABSTRACT

A tubular member surrounds and is pin connected to a support shaft and has a cam profile on its surface that coacts with a roller mounted to a first sleeve around the tubular member. A second sleeve, around the shaft and spaced from the first sleeve, is resiliently biased toward the first sleeve; cooperating elements on the sleeves interconnect the sleeves when the cam roller engages the cam profile. A drive sheave is fixed to the first sleeve and a driven sheave is fixed to the second sleeve.

10 Claims, 6 Drawing Figures

REVERSING CLUTCH

BRIEF SUMMARY OF THE INVENTION

A support shaft has fixed thereto a clutch assembly with a cam profile on its surface. A cam roller mounted to a sleeve surrounding the clutch assembly coacts with the cam profile. A second sleeve surrounds the shaft and is spaced apart from the first sleeve, with cooperating elements on both sleeves that interconnect them when the cam roller coacts with the cam profile. A sheave mounted to the first sleeve rotates it and moves the cam roller over the cam profile and a second sheave on the second sleeve rotates when the sheaves are thereby interconnected.

For a further understanding of the invention and for features and advantages thereof, reference may be made to the following description and the drawing which illustrates a preferred embodiment of equipment in accordance with the invention.

DETAILED DESCRIPTION

Figures 1, 5:
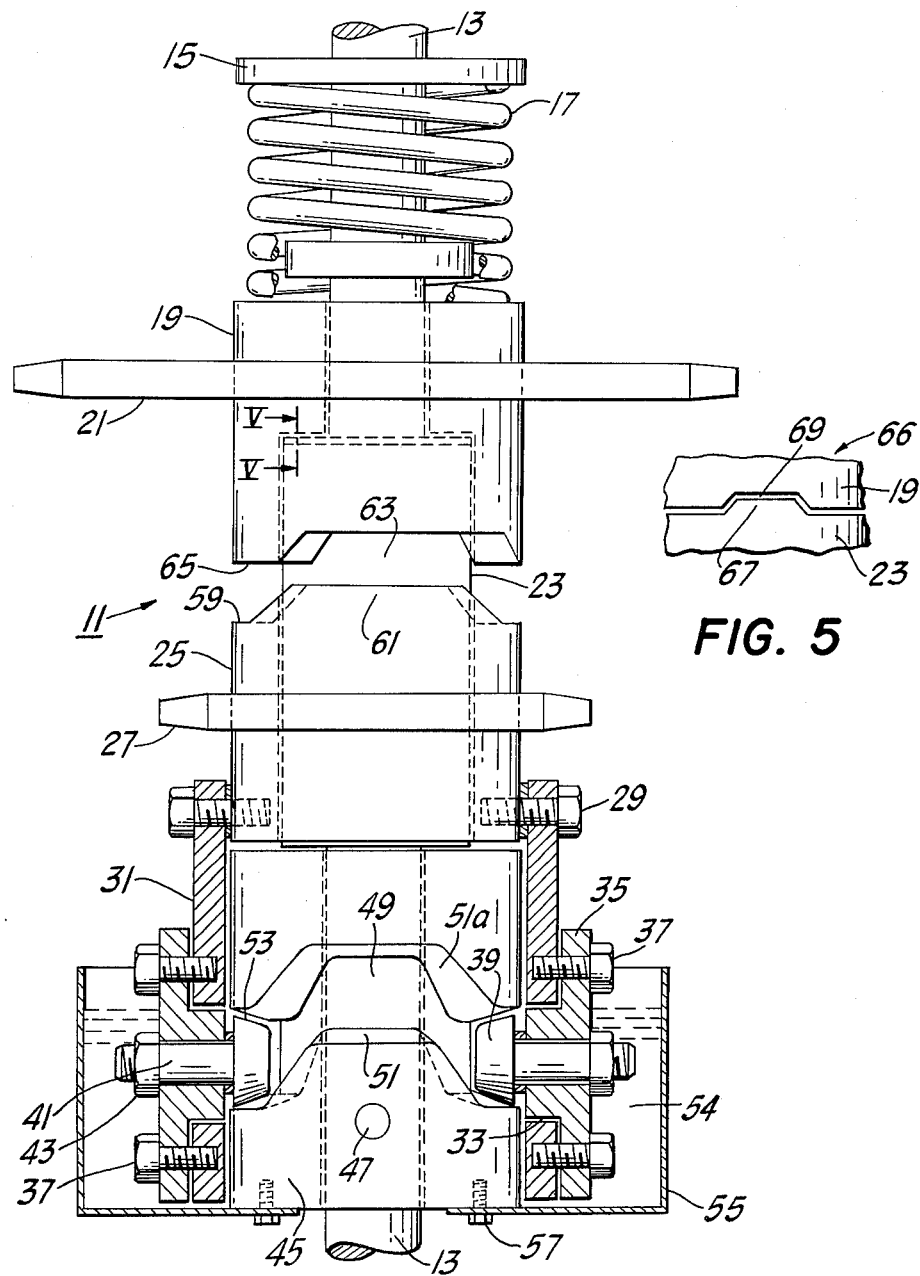
FIG. 1 is a plan view, partly in section, of a reversing clutch in accordance with the present invention, shown in one operative position.
FIGS. 5 and 6 are sectional views along lines V—V and VI—VI of FIGS. 1 and 2 respectively.

Referring to FIG. 1, a reversing clutch 11 in accordance with the present invention comprises a support shaft 13 on which is fixed a spring retainer 15 that coacts with a spring 17, shown as surrounding the shaft 13. The spring 17 also coacts with the hub portion 19 of a reversing sprocket 21 for the fuel gas or for the air and waste heat valve operating mechansim. Such mechanism is shown, typically, in U.S. Pat. No. 3,751,342.

The shaft 13 is provided with a cylindrical portion 23 of larger diameter, located about where shown in FIG. 1. The lower portion of the shaft 13 extends downwardly, as viewed in FIG. 1, and has the same diameter as the portion of the shaft above the cylindrical portion 23.

The lower portion of the cylindrical portion 23 is surrounded by a tubular member 25 to which is fixed a drive sheave 27. The tubular member 25 is connected as by cap screws 29 or the like to a surrounding tubular member 31. As shown in FIG. 1, the tubular member 31 is provided with a pair of opposed ports or openings 33 which accommodate cam follower supports 35 that are secured to the member 31 by cap screws 37 or the like. Each cam follower support 35 carries a cam follower 39 mounted to a shaft 41 that is secured in place by a nut 43.

The lower portion of shaft 13 carries a cam assembly 45 that is pin connected to the shaft 13 as at 47. The cam assembly 45 has a cam follower groove 49 therein in which cam followers 39 travel. The surface of the groove 49 is generally tapered as at 51 (lower) and 51 a (upper) to coact with the frusto-conical surface 53 of the cam followers 39.

An oil reservoir containing oil 54 and comprising a cylindrical pan structure 55 is secured as by cap screws 57 to the cam assembly 45 and oil in the reservoir lubricates the cam mechanism therewithin.

Figures 2, 6:
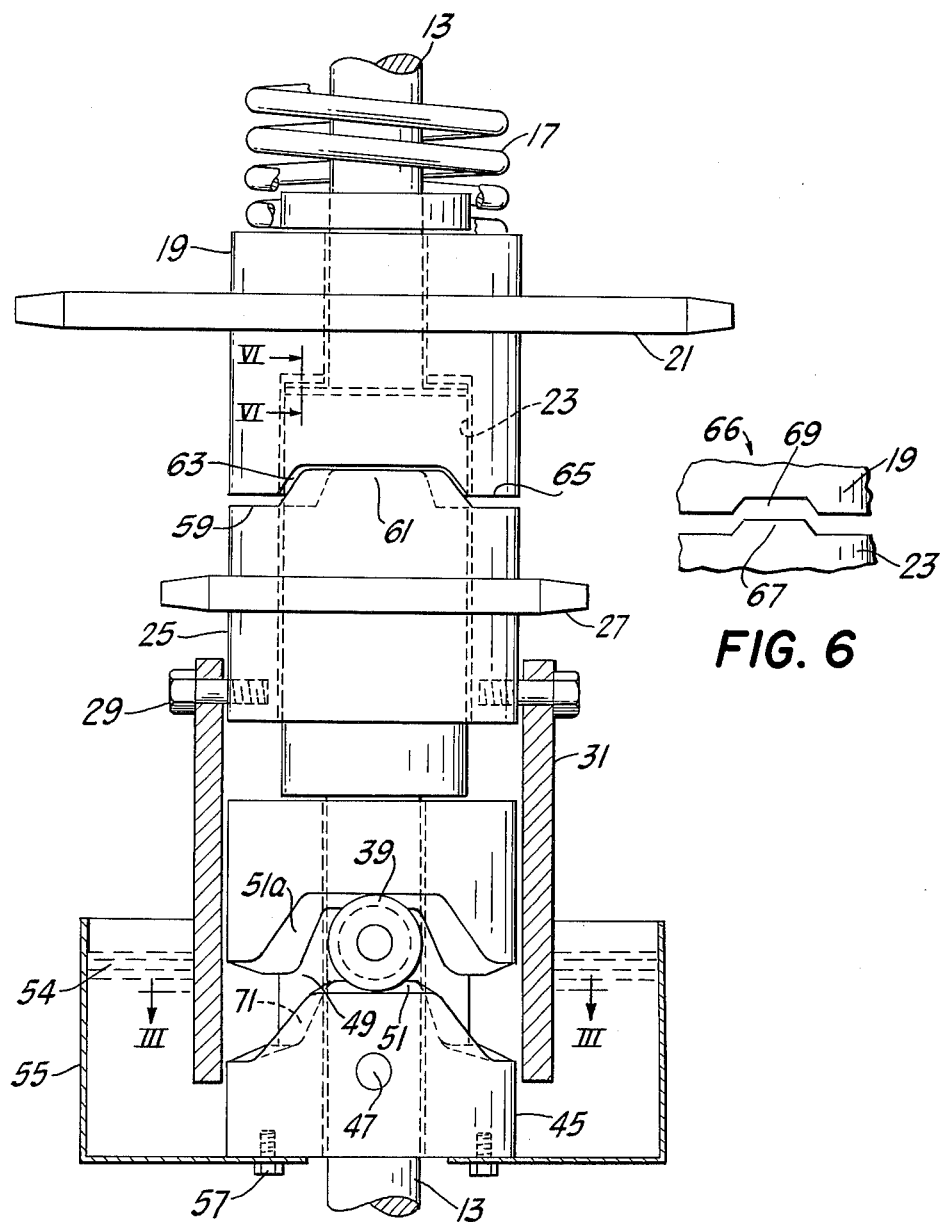
FIG. 2 is a view, similar to that of FIG. 1, showing the clutch in another operative position.

The upper edge 59 of the tubular member 25 is provided with a pair of tongues 61 that coact with matching grooves 63 in the lower edge 65 of the tubular member 19. FIG. 1 shows the tongue 61 and groove 63 in separated relation, while FIG. 2 shows them in mated, engaging relation.

FIG. 5 shows a locking gear 66 in the engaged position. The top surface of the cylinder portion 23 has a pair of tongues 67 that coact, when brought into engagement, with corresponding grooves 69 in the lower surface of the inner reentrant portion of the hub 19. In FIG. 6 the tongues 67 and corresponding grooves 69, comprising the locking gear 66, are shown disengaged.

U.S. Pat. No. 3,751,342 describes a reversing mechanism for a coke oven battery that comprises a reversing plate and a spaced-apart locking plate with a plurality of cooperating members disposed between the plates. Each member is connected to a plurality of fuel or air valves by actuating rods, and means is provided to move the reversing plate along an axis. When the reversing plate and locking plate are in one position relative to the members, only certain members move when the reversing plate moves. Thus, the heating cycle of a coke oven battery which is burning a particular type of fuel is changed.

Means is provided to shift the reversing plate and the locking plate to another position relative to the members. Then, when the reversing plate moves, the heating cycle, using another type of fuel, changes.

The reversing clutch of the present invention may, of course, be used in any manner desired, but in a typical situation it may be used in conjunction with the reversing mechanism described in U.S. Pat. No. 3,751,342. The reversing clutch provides intermittent movement of the fuel gas and the air and waste heat actuating rods. Thus, the fuel gas valves can close before the air and waste heat valves are opened, and the air and waste heat valve rod travel is limited before the fuel gas valves are opened again on a reverse cycle.

In FIGS. 1 and 2 reversing sheave 21 is connected through a chain (not shown) around it to the fuel gas or the air and waste heat valve rod systems. A reversing clutch of the type shown is included in the fuel gas and in the air and waste heat valve systems, located in the alley. Drive sheave 27 cooperating with a chain (not shown) around it is connected to the aforementioned reversing machine through a rod system.

Figure 3:
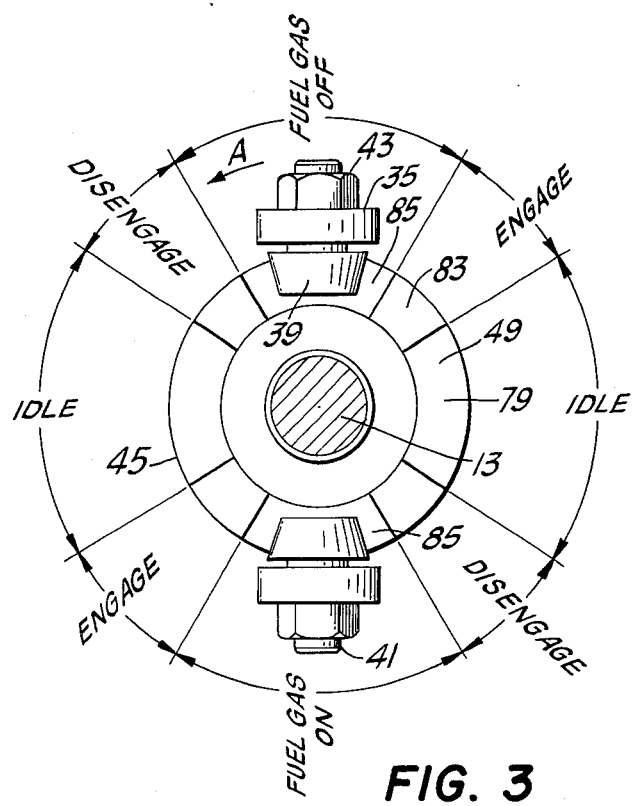
FIG. 3 is a diagrammatic showing of a fuel gas cam operating cycle as related to a view along line III—III of FIG. 2.
Figure 4:
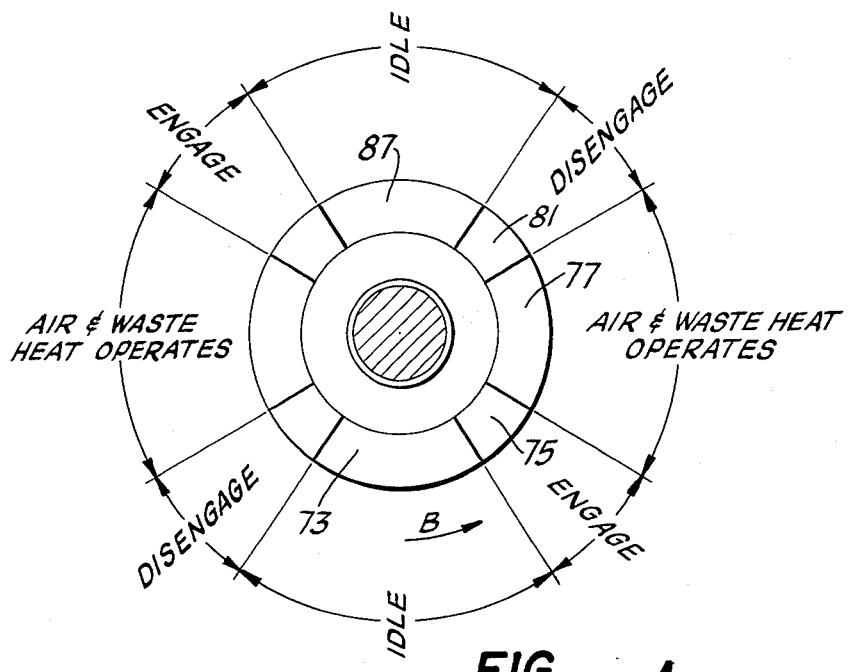
FIG. 4 is a view similar to that of FIG. 3, but for an air and waste heat cam operating cycle.

When a reverse in the heating cycle is indicated, the reversing clutch 11 in the fuel gas system initially is in the engaged position, shown in FIGS. 2 and 3, and the air and waste heat reversing clutch 11 initially is in the idle position, shown in FIGS. 1 and 4. Then movement of the reversing machine actuates sheave 21 and sheave 27 which are connected through the clutch assembly 45. The tubular members 19, 25, 31 rotate counter-clockwise in the direction of the arrow A as viewed in FIG. 3, so that the cam rollers 39 move to the positions marked "Disengage". In FIG. 2, the cam rollers 39 move to the left down the sloping surface 71 of the groove 49 until they reach the bottom thereof. When the cam roller 39 reached the disengaged position, the locking gear 66, being disengaged as shown in FIG. 2, becomes engaged as shown in FIG. 1. At the same time, roller cams (not shown) on the air and waste heat clutch assembly, being in the "idle" position 73 of FIG. 4 initially, reach the engaged position 75 of FIG. 4. Sheave 21 is thereby connected to sheave 27 through the clutch mechanism 61, 63 and disengages the locking gear 66 (FIG. 6).

Continued rotation of the cam rollers of FIG. 4 (not shown) in a counterclockwsie direction of arrow B, moves the rollers to position 77 (FIG. 4) at which the air and waste heat valves are reversed. At the same time, the fuel gas cam roller 39 move to position 79 (FIG. 3) which is an "idle" position when the fuel gas valves are closed.

When the cam rollers (not shown) of FIG. 4 reach position 81, the locking gear mechanism 66 again becomes disengaged (FIG. 6), and at the same time the cam rollers 39 of the fuel gas clutch assembly move to position 83, FIG. 3. In such position, sheave 21 and sheave 27 are again connected through clutch mechanism 61, 63, and the clutch mechanism 66 (FIG. 6) becomes diengaged.

Then, as the cam rollers 39 travel to position 85 (FIG. 3), the fuel gas valves are opened ("fuel gas on" in FIG. 3), and the air and waste heat cam rollers (not shown) move to position 87 where the air and waste heat valves are closed ("idle" position in FIG. 4). Thus, a reversing cycle is complete.

Now, when the next reverse is indicated, the cam rollers 39 rotate in the opposite direction and when they reach the position indicated in FIGS. 3 and 4, that reverse is completed.

Now, while the operation of the apparatus described herein has been predicated upon the automatic changeover from coke oven gas to blast furnace gas firing, it is to be well understood that such apparatus can be used in the reversing mechanism of a battery heated with coke oven gas only. In such situation, only a single sheave, such as sheave 27, driven by a hydraulic or electric motor, is used in the clutch assembly of a fuel gas rod system and in a clutch assembly of the air and waste heat rod system.

From the foregoing description of one embodiment of the invention, those skilled in the art should recognize many important features and advantages of it, among which the following are particularly significant:

That the reversing clutch assembly is positive in operation thereby avoiding any possible slippage experienced usually with friction clutch devices; and That the clutch assembly of the present invention is simple to construct, effective and reliable.

Although the invention has been described herein with a certain degree of particularity it is understood that the present disclosure has been made only as an example and that the scope of the invention is defined by what is hereinafter claimed.

What is claimed is:

1. In a coke oven reversing mechanism including mechanical means operating both the fuel gas valves and the air and waste heat valves, a reversing clutch mechanism comprising:

a. a support shaft having fixed thereon a clutch assembly with a cam profile on the surface thereof;

b. a cam roller mounted to a sleeve surrounding said clutch assembly and engageable with said cam profile;

c. first sheave means secured to said first sleeve for turning said sleeve and urging said cam roller along the cam profile, said first sleeve moving axially of said shaft and engaging a second sheave engageable with said mechanical means; and d. a second sleeve surrounding said shaft and supporting said second sheave.

2. The invention of claim 1 including:

a. clutch means for engaging and disengaging said first sleeve and said second sleeve.

3. The invention of claim 2 including:

a. means engaging said second sleeve to said support shaft when said first and second sleeves are disengaged.

4. The invention of claim 3 including:

a. means for lubricating the cam roller and cam profile on which said roller travels.

5. The invention of claim 3 including:

a. resilient bias means coacting with said shaft and said second sleeve and urging said second sleeve in a direction toward said first sleeve.

6. In a coke oven reversing mechanism including mechanical means operating both the fuel gas valves and the air and waste heat valves, a reversing clutch mechanism comprising:

a. a support shaft having fixed thereon a clutch assembly including peripheral surface groove having on one surface a cam profile;

b. a first slideable and rotatable sleeve surrounding said clutch assembly and carrying a cam roller that engages and coacts with said one surface;

c. means secured to said first sleeve for rotating said sleeve;

d. a second slideable and rotatable sleeve surrounding said shaft and spaced apart axially from said first sleeve;

e. rotatable means secured to said second sleeve;

f. resilient bias means urging said second sleeve toward said first sleeve; and g. means that interconnects said first and second sleeves when said cam roller coacts with said cam profile and urges said first sleeve axially of said shaft, so constructed and arranged that, as said means for rotating said first sleeve turns, said rotatable means on said second sleeve rotates.

7. The invention of claim 6 including:

a. means interconnecting said second sleeve and said shaft when said first and second sleeves are not interconnected, with said resilient bias means maintaining said interconnection.

8. The invention of claim 6 including:

a. means for lubricating said cam profile and roller engageable therewith.

9. The invention of claim 8 wherein:

a. said means is a pan surrounding said clutch assembly adapted to hold a quantity of lubricant.

10. The invention of claim 6 wherein:

a. said clutch assembly is pin connected to said support shaft.

* * * * *